Sept. 2, 1924.  1,506,973
R. CONRADER
TANK DISCHARGE CONTROLLING DEVICE
Filed Aug. 18, 1919
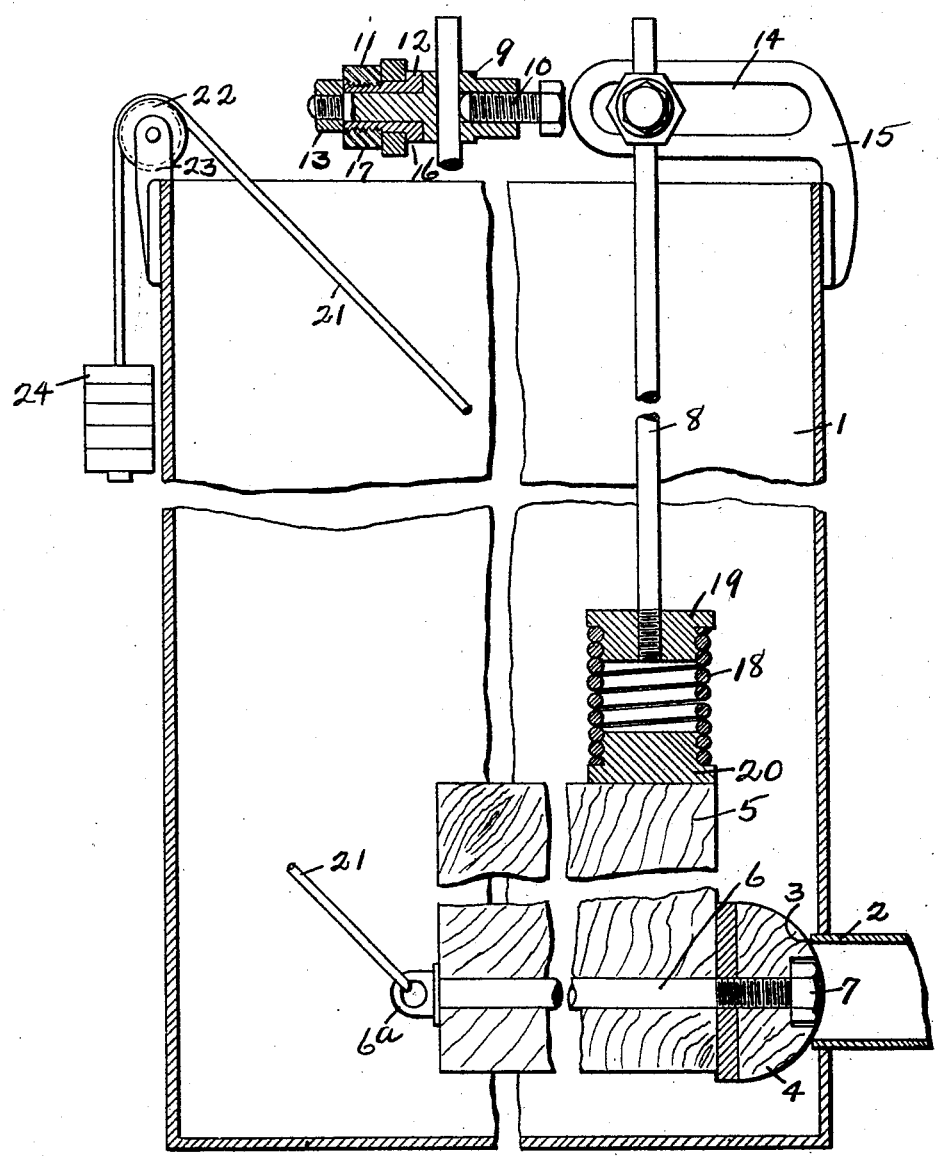
Inventor:
Rudolph Conrader
by H. C. Lord
Attorney.

Patented Sept. 2, 1924.

1,506,973

UNITED STATES PATENT OFFICE.

RUDOLPH CONRADER, OF ERIE, PENNSYLVANIA.

TANK-DISCHARGE-CONTROLLING DEVICE.

Application filed August 18, 1919. Serial No. 318,124.

*To all whom it may concern:*

Be it known that I, RUDOLPH CONRADER, a citizen of the United States, residing at Erie, in the county of Erie and State of Pennsylvania, have invented new and useful Improvements in Tank-Discharge-Controlling Devices, of which the following is a specification.

In operating systems for the collection of oil it is common to fill tanks adjacent to the well from the well and for a gauger in the employ of the purchaser of the oil, usually a pipe line company, to gauge the oil of the tank and to draw the oil off the tank. The oil is carried through long lines of pipe, sometimes by gravity and sometimes through the action of a pump but the discharge end of the ordinary collecting tank usually has a reduced pressure so that if the discharge opening is permitted to remain open until the oil is entirely discharged to the level of the opening air is carried into the line and this air very materially interferes with the operation of the line. For this reason the discharging of the tank requires careful attention of the operator. With the present invention this difficulty is obviated.

The invention is illustrated in the accompanying drawing wherein a vertical section is shown of a collecting tank with the device of my invention in place.

1 marks the tank, 2 a discharge pipe leading from the side of the tank, 3 a valve seat at the end of the discharge pipe, 4 a valve operating on the seat 3, and 5 a float to which the valve is attached, the valve being preferably secured by a bolt 6 extending through the float and through the valve, the bolt being provided with a nut 7 on the face of the valve.

It is desirable to control the movement of the valve under the influence of the float so that the valve may surely seat on the opening. It will be understood that these tanks are quite large, particularly when compared with the valve. Further it is desirable to have the closing action of the valve rather pronounced so that there is no danger of its closing before the oil reaches a certain level and on the other hand that there is a positive closing on a reduction below this level. The guiding means here shown comprises an arm 8 which extends through a head 9 and may be adjusted vertically therein and locked in position by a set screw 10. The head 9 has an extension 11 which extends through a sleeve bolt 12. This extension is secured in the sleeve bolt by a nut 13. The sleeve bolt 12 extends through a slot 14 in a bracket 15, the bracket being mounted at the top of the tank. The sleeve bolt 12 has a head 16 which engages the face of the bracket 15 and a nut 17 clamps the sleeve bolt on the bracket.

With this construction the valve is swingingly mounted by means of the arm 8, the extension 11 turning in the sleeve bolt 12. It will be noted that as the level recedes the path of the valve is in an arc passing through the axis of the valve 3 and with an axis coincident with the axis of the head 9. In moving downwardly, therefore, with a level of liquid the float is maintained at some distance from the seat 3 even when the level of the liquid is very slightly above this but as the level of liquid recedes the float moving in this arc is carried very rapidly toward the seat 3 so that with a very slight variation in level the valve is carried to its seat and prior to this slight change in level the float and valve are at a sufficient distance from the discharge opening to be out of the draft of the discharge. By reason of this it is perfectly safe to so adjust the float as to carry the level of liquid very close to the discharge opening with an assurance that there will be a positive closure in ample time and that the closure will take place uniformly with a given level of liquid.

By adjusting the bolt 12 toward and from the side of the tank, or relatively to a vertical line extending through the float the pivot of the arm 8 may be placed nearer the tank than the center of buoyancy of the float so that if there is no suction on the line there will be a tendency for the float to open with a level of liquid above the discharge opening. This will occur, therefore, as the tank fills providing the discharge opening is closed by the ordinary valve (not shown) which are used for this purpose.

It is desirable to permit the valve to have a slight movement relatively to the rod 8 so as to take care of inaccuracies in the adjustment. In the present instance this is provided for by inserting a yielding connection between the rod 8 and the float 5 preferably in the form of a spring 18. The spring is secured to a head 19 carried by the rod 8 at one end and to a head 20 secured to the float 5 at the other. This spring carries the valve to its seat. If the valve is slightly out of position the spring yields, up or down, or sidewise sufficiently to accomplish the perfect seating of the valve.

It is desirable to provide a means through which the valve may be positively opened. An eye 6ª is arranged in the bolt 6 and a cable or cord 21 extends from the eye 6ª over a pulley 22 carried by a bracket 23 at the upper end of the tank at the side opposite the discharge opening. Weights 24 are provided for holding the cord in the pulley 22. The weights are not sufficient, however, to lift the valve and float or to interfere with the float following down with the liquid so as to close the valve. Where there is any leakage in the line so that there is more or less suction on the valve considerable pressure is necessary to open it and it is, therefore, preferable to have the bolt to which the releasing device or cord is attached extend directly to the valve.

What I claim as new is:—

1. In a tank discharge controlling device, the combination of a tank having a discharge opening at the side; a closure valve for the opening; a guiding device directing the movement of the valve to the opening comprising a swinging arm having its axis above the valve at the upper part of the tank; and a float carrying the valve.

2. In a tank discharge controlling device, the combination of a tank having a discharge opening at the side; a closure valve for the opening; a guiding device directing the movement of the valve to the opening comprising a swinging arm having its axis above the valve; a float carrying the valve; and means for adjusting the position of the axis of the arm relatively to a vertical line extending from the float.

3. In a tank discharge controlling device, the combination of a tank having a discharge opening surrounded by a valve seat having a horizontal axis; a closure valve for the opening operating on said seat; a guiding device directing the movement of the valve to the seat comprising a swinging arm having its pivot remote from the axis of the valve seat; and a float carrying the valve.

4. In a tank discharge controlling device, the combination of a tank having a discharge opening at the side; a closure valve for the opening; a guiding device directing the movement of the valve to the opening comprising a swinging arm; a yielding element in the arm permitting a deflection of the valve to its seat; and a float carrying the valve when released.

5. In a tank discharge controlling device, the combination of a tank having a discharge opening at the side; a closure valve on the opening; a guiding device directing the movement of the valve to the opening comprising a swinging arm; a spring connection in the arm permitting a deflection of the valve to its seat; and a float carrying the valve when released.

6. In a tank discharge controlling device, the combination of a tank having a discharge opening at the side; a closure valve head; a float on which the valve head is mounted; a bolt extending through the valve head and float; a connection leading from the bolt to the opposite side of the tank; and guiding means for directing the valve to the opening.

7. In a tank discharge controlling device, the combination of a tank having a discharge opening at its side; a closure valve adapted to close the opening; a float on which the valve is mounted; a bolt extending through the valve and float; a connection extending from the bolt to the opposite side of the tank; an arm carrying the valve and float pivotally mounted at the upper part of the tank; means for adjusting the arm to vary the axis of the arm relatively to a vertical line extending from the float; and a spring connection in the arm permitting the yielding of the arm to allow a variation in the movement of the valve.

In testimony whereof I have hereunto set my hand.

RUDOLPH CONRADER.